United States Patent Office 3,035,078
Patented May 15, 1962

3,035,078
STABILIZED POLYISOCYANATE COMPOSITIONS
Richard C. De Long, Snyder, Melvin Kaplan, Tonawanda, and Charles R. Wagner, Orchard Park, N.Y., assignors to Allied Chemical Corporation, New York, N.Y., a corporation of New York
No Drawing. Filed Feb. 4, 1959, Ser. No. 791,036
6 Claims. (Cl. 260—453)

This invention relates to improved polyisocyanate compositions and to a method for preparing such compositions, and more particularly refers to organic polyisocyanate compositions having incorporated therein a small amount of a special stabilizing agent to reduce the tendency to discolor.

Organic polyisocyanates are of commercial importance as components for producing polymeric materials in the form of elastomers, coatings and the like. The combination of polyisocyanates with active hydrogen-containing materials, such as polyesters, polyols, polyamides and the like, is currently the object of extensive study and commercial activity. However, the tendency of the polyisocyanates to discolor is a serious defect and one which limits the extent to which these useful components can be used. Also of importance is the requirement that the nature and amount of stabilizing agent be such that it does not interfer with or have any adverse effect on the normal subsequent uses of the polyisocyanate.

It is therefore an object of our invention to devise means for preventing the discoloration of polyisocyanates.

Another object is to provide polyisocyanate compositions of reduced tendency to discolor on storage.

A further object of the present invention is to provide a stabilizing agent to prevent the discoloration of polyisocyanates, which stabilizing agent will be effective at very low concentration to avoid contamination of the polyisocyanate and will not interfere with the normal use of the polyisocyanate.

These and other objects will be apparent from the following description of our invention.

In accordance with the present invention polyisocyanates of reduced tendency to discolor on storage are obtained by admixing with a small amount, of the order of 0.005% to 0.1%, preferably 0.005% to 0.05%, by weight of polyisocyanate of a polyhydroxy aryl compound in which the hydroxyl groups are directly attached to a monocyclic aryl nucleus.

Organic polyisocyanates or mixtures thereof can be treated in the manner of this invention.

Illustrative examples of organic polyisocyanates are:

Hexamethylene diisocyanate
Tetramethylene diisocyanate
Benzene di- and tri-isocyanates
Toluene di- and tri-isocyanates
Mixtures of 2,4- and 2,6-tolyl-diisocyanates
    4,4'-diphenylene diisocyanates
    4,4'-dicyclohexylmethane diisocyanate
    Naphthalene di- and tri-isocyanates
    Stilbene diisocyanates
    Ditolylmethane diisocyanates
    Dixylylmethane diisocyanates
Phenyltolylmethane di- and tri-isocyanates
    Triphenylmethane isocyanates
3,3'-dimethoxy-diphenylene-4,4'-diisocyanate Illustrative examples of the stabilizing agents which can be used in the composition of the present invention are:

Resorcinol
Pyrocatechol
Hydroquinone
Pyrogallol
Nordihydroguiaretic acid and mixtures of two or more such polyhydroxy compounds.

The compositions of our invention can be prepared by merely mixing the ingredients in any convenient fashion. If desired, one or more of the ingredients can be dissolved in a suitable solvent and after formulation of the mixture the solvent can be removed by evaporation, preferably in a vacuum. Also, blending of the constituents can be promoted by heating the mixture. Preferably the stabilized composition is prepared by simple mixing of the ingredients and agitation of the mass at ambient temperature until a homogeneous mass is obtained.

The amount of polyhydroxy compound used to impart the stabilized character to the polyisocyanate composition is normally quite small. As little as 0.005% by weight of a polyisocyanate has been found to provide protection against coloration on storage. Amounts as much as 0.1% or more are generally not desirable because they contaminate the polyisocyanate and are not particularly effective in decreasing the tendency to discolor. Preferably, an amount of the polyhydroxy compound in the range of 0.005% to 0.05% is used to provide the desired stability against color deterioration on storage of the polyisocyanates.

The invention will be illustrated by the following examples. Parts are by weight and temperatures are given in degrees centigrade.

EXAMPLE I

Technical tolylene diisocyanate (a mixture of approximately 80 parts 2,4- and 20 parts 2,6-tolylene diisocyanates) was distilled and a portion of the distilled product was stored in a glass bottle, stoppered with a Teflon plug at 50° for 18½ hours. The color of the tolylene diisocyanate increased from 15 units to over 200 units measured on the Hazen (cobalt-platinum) scale as determined by the method described on pages 87–89 of "Standard Methods for the Determination of Water, Sewerage and Industrial Wastes" (10th edition 1955, published by the American Public Health Association).

A similar quantity of the distilled tolylene diisocyanate, to which was added 0.01% of pyrocatechol, was likewise stored at 50° for 18½ hours. The color of this stabilized composition increased from 15 units to only 30 units.

Similarly, distilled tolylene diisocyanate was stored at 150° for 70 minutes. The color of this material increased for 0 to 2.0 Barrett units. A like quantity of distilled tolylene diisocyanate to which was added 0.05% to 0.1% of hydroquinone changed in color from 0 to 0.2 Barrett units after storage at 150° for 70 minutes.

EXAMPLE II

Fifty parts of freshly distilled tolylene diisocyanate were placed in each of several 8-inch test tubes provided with Teflon shielded stoppers. To each tube the indicated addition was made and the tubes placed in a storage cabinet maintained at 50°. At periodic intervals the tubes were examined for color change. The results of this test are given in the following table:

*Table I*

| Sample | Color¹ at 0 Hours | 17 Hrs. | 1 Day | 2 Days | 7 Days | 12 Days | 32 Days |
|---|---|---|---|---|---|---|---|
| TDI only | 15 | 40 | (²) | (²) | (²) | (²) | (²) |
| TDI+2 Drops CS₂ | 15 | 35 | (²) | (²) | (²) | (²) | (²) |
| TDI+0.005 part Pyrogallol | 15 | 25 | 30 | 30 | 30 | 35 | 35 |
| TDI only (at 25°) | 15 | 15 | 30 | 80 | | | (³) |

¹ In Hazen units.
² Too yellow to rate.
³ Color after 19 days was >200 H.

EXAMPLE III

In an analogous manner to that described in Example II above the stabilizing effect of various polyhydroxy compounds was demonstrated using 60 parts of freshly distilled tolylene diisocyanate and 0.006 part of the indicated polyhydroxy. The samples were stored in a cabinet maintained at 50°. Colors are given in Hazen units.

*Table II*

| Sample | Color After Interval of — | | | | | |
|---|---|---|---|---|---|---|
| | 18½ Hrs. | 26 Hrs. | 43 Hrs. | 67 Hrs. | 91 Hrs. | 28 Days |
| Control | 190 | <200 | | | | |
| Do | <200 | <200 | | | | |
| Pyrocatechol | 35 | 45 | 45 | 45-45 | 45 | >200 |
| Do | 30 | 45 | 40-45 | 45 | 45-50 | 80 |
| Resorcinol | 50 | 50 | 50 | 55 | 60 | 60 |
| Do | 55 | 55 | 55 | 55 | 65 | 65 |
| Pyrogallol | 60 | 55 | 55 | 55 | 55 | 50 |
| Do | 50 | 50 | 50 | 50 | 50 | 45-50 |

EXAMPLE IV

The effect of various amounts of stabilizer was determined as follows:

Pyrocatechol in various amounts was added to 50 parts of 2,4-tolylene diisocyanate and the compositions were stored at 50° for 21 days.

The control (no phenol added) darkened to >200 H after five days.

The composition containing 0.005% stabilizer had a color of 50 H after 21 days. The mixture containing 0.01% had a color of 40 H while that containing 0.02% had a color of only 20-25 H after 21 days.

EXAMPLE V

Freshly distilled 2,4-tolylene diisocyanate (color <20 H units) was mixed with a number of organic compounds to determine the stabilizing potency of these additives. In each instance, to 50 parts of the polyisocyanate 0.005 part of the additive was added and the mixture agitated to solution. The mixture, in a Pyrex glass test tube, was purged with nitrogen and sealed with a polyethylene plug. The tubes were then placed in a storage cabinet and maintained at ambient temperature for the interval indicated in the following tabulation of the results obtained.

*Table III*

| Additive | Color After Standing at Ambient Temperature for— | | | | | |
|---|---|---|---|---|---|---|
| | 8 Days | 13 Days | 14 Days | 18 Days | 22 Days | 345 Days |
| Ascorbic Acid | <50 | abt. 75 | 75-100 | 75-100 | | |
| Benzoin | <50 | 50-75 | abt. 100 | abt. 100 | | |
| 1,5-Dihydroxy-Napthalene | (¹) | (²) | (²) | (²) | (²) | (²) |
| α-Naphthol | >100 | (²) | (²) | (²) | (²) | (²) |
| β-Naphthol | 75 | >100 | | | | |
| None (Control) | <50 | abt. 60 | abt. 75 | 75-100 | >100 | >200 |
| Nordihydroguiaretic Acid | 30 | 30 | 30 | 30 | 30 | abt. 100 |

¹ Solution turned light brown immediately after mixing.
² Strong yellow.

The term "polyhydroxy compound" as used herein is meant to include polyhydroxy aryl compounds in which the hydroxy groups are directly attached to a monocyclic aryl nucleus. The aryl group may contain other substituents such as alkyl and aryl groups, but aryl hydroxides in which the hydroxyl groups are attached to a condensed aryl nucleus, as for example α-naphthol, β-naphthol or dihydroxy-naphthalene are excluded since we have demonstrated that such closely related compounds are ineffective as stabilizing inhibitors.

Although certain preferred embodiments of the invention have been disclosed for purpose of illustration, it will be evident that various changes and modifications may be made therein without departing from the scope and spirit of the invention.

We claim:

1. An organic polyisocyanate of the class consisting of $R(NCO)_2$ and $R(NCO)_3$ wherein R is a hydrocarbon radical, said polyisocyanate stabilized against discoloration by having incorporated therein a compound selected from the group consisting of pyrocatechol, pyrogallol, hydroquinone and resorcinol in amount sufficient to stabilize the organic polyisocyanate, said amount being less than 0.1% by weight of the organic polyisocyanate.

2. An organic polyisocyanate of the class consisting of $R(NCO)_2$ and $R(NCO)_3$ wherein R is a hydrocarbon radical, said polyisocyanate stabilized against discoloration by having incorporated therein from about 0.005% to less than 0.1% by weight of the organic polyisocyanate of a compound selected from the group consisting of pyrocatechol, pyrogallol, hydroquinone and resorcinol.

3. An organic polyisocyanate of the class consisting of $R(NCO)_2$ and $R(NCO)_3$ wherein R is a hydrocarbon radical, said polyisocyanate stabilized against discoloration by having incorporated therein from about 0.005% to less than 0.1% by weight of the organic polyisocyanate of pyrocatechol.

4. An organic polyisocyanate of the class consisting of $R(NCO)_2$ and $R(NCO)_3$ wherein R is a hydrocarbon radical, said polyisocyanate stabilized against discoloration by having incorporated therein from about 0.005% to less than 0.1% by weight of the organic polyisocyanate of pyrogallol.

5. An organic polyisocyanate of the class consisting of $R(NCO)_2$ and $R(NCO)_3$ wherein R is a hydrocarbon radical, said polyisocyanate stabilized against discoloration by having incorporated therein from about 0.005% to less than 0.1% by weight of the organic polyisocyanate of hydroquinone.

6. An organic polyisocyanate of the class consisting of $R(NCO)_2$ and $R(NCO)_3$ wherein R is a hydrocarbon radical, said polyisocyanate stabilized against discoloration by having incorporated therein from about 0.005% to less than 0.1% by weight of the organic polyisocyanate of resorcinol.

(References on following page)

References Cited in the file of this patent

UNITED STATES PATENTS

| | | |
|---|---|---|
| 1,550,869 | Bogin | Aug. 25, 1925 |
| 1,774,845 | Rogers | Sept. 2, 1930 |
| 1,913,367 | Calcott et al. | June 13, 1933 |
| 2,885,420 | Spiegler | May 5, 1959 |
| 2,950,307 | France et al. | Aug. 23, 1960 |

FOREIGN PATENTS 1,147,451  France  Nov. 26, 1957

OTHER REFERENCES

Morawetz: Industrial & Engineering Chem., vol. 41, No. 7 (1949), pp. 1442–1447.